US012661801B2

(12) United States Patent
Kwak et al.

(10) Patent No.: US 12,661,801 B2
(45) Date of Patent: Jun. 23, 2026

---

(54) TRAY AND ROBOT HAVING SAME

(71) Applicant: LG ELECTRONICS INC., Seoul (KR)

(72) Inventors: Yongsoo Kwak, Seoul (KR); Taiwoo Kim, Seoul (KR); Gunho Lee, Seoul (KR); Jaewon Chang, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 599 days.

(21) Appl. No.: 18/019,741

(22) PCT Filed: Aug. 4, 2020

(86) PCT No.: PCT/KR2020/010260
§ 371 (c)(1),
(2) Date: Feb. 3, 2023

(87) PCT Pub. No.: WO2022/030659
PCT Pub. Date: Feb. 10, 2022

(65) Prior Publication Data
US 2023/0278230 A1     Sep. 7, 2023

(51) Int. Cl.
*B25J 11/00*     (2006.01)
*B25J 5/00*     (2006.01)
*B25J 15/00*     (2006.01)
*B25J 19/00*     (2006.01)

(52) U.S. Cl.
CPC ............. *B25J 11/008* (2013.01); *B25J 5/007* (2013.01); *B25J 15/0014* (2013.01); *B25J 19/0091* (2013.01)

(58) Field of Classification Search
CPC ...... B25J 11/008; B25J 5/007; B25J 15/0014; B25J 19/0091
See application file for complete search history.

(56) References Cited

U.S. PATENT DOCUMENTS

| | | | | |
|---|---|---|---|---|
| 2006/0149419 A1* | 7/2006 | Ogawa | .................... | B25J 5/007 |
| | | | | 700/245 |
| 2017/0356167 A1* | 12/2017 | Paul | ....................... | B25J 15/024 |
| 2018/0104829 A1* | 4/2018 | Altman | ................. | H01M 10/48 |
| 2019/0022850 A1* | 1/2019 | Luo | ........................... | B25J 5/007 |
| 2020/0047349 A1* | 2/2020 | Sinnet | ..................... | B25J 5/007 |

(Continued)

FOREIGN PATENT DOCUMENTS

| | | |
|---|---|---|
| CN | 207093656 | 3/2018 |
| CN | 108555939 | 9/2018 |

(Continued)

OTHER PUBLICATIONS

PCT International Application No. PCT/KR2020/010260 International Search Report dated Apr. 26, 2021, 2 pages.

*Primary Examiner* — Saul Rodriguez
*Assistant Examiner* — Ashley K Romano
(74) *Attorney, Agent, or Firm* — Birch, Stewart, Kolasch & Birch, LLP

(57) ABSTRACT

A tray according to an embodiment of the present invention may include: a housing having a lower plate and a perimeter wall provided on the lower plate and having a space formed inside the perimeter wall; a stabler comprising a moving body movably accommodated in the space; and a plurality of dampers disposed between an edge of the moving body and the perimeter wall.

18 Claims, 10 Drawing Sheets

(56)            References Cited

U.S. PATENT DOCUMENTS

| | | | |
|---|---|---|---|
| 2020/0206902 A1 | 7/2020 | Jung et al. | |
| 2021/0212455 A1 | 7/2021 | Jung et al. | |
| 2021/0347060 A1* | 11/2021 | Byl | B25J 11/009 |
| 2022/0111508 A1* | 4/2022 | Kim | B25J 19/0091 |
| 2022/0305641 A1* | 9/2022 | Murphy | B25J 19/021 |
| 2025/0073914 A1* | 3/2025 | Jin Kim | B25J 5/007 |

FOREIGN PATENT DOCUMENTS

| | | |
|---|---|---|
| CN | 209115598 | 7/2019 |
| CN | 209789121 | 12/2019 |
| KR | 1020200084289 | 7/2020 |
| KR | 1020200085658 | 7/2020 |

* cited by examiner

【Fig.1】
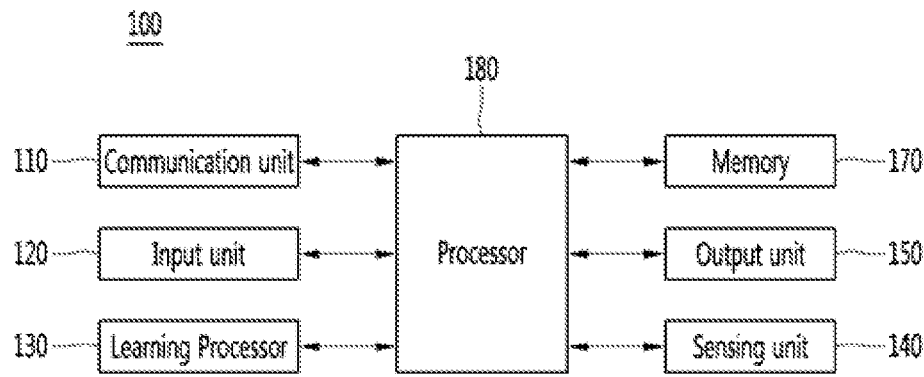
【Fig.2】
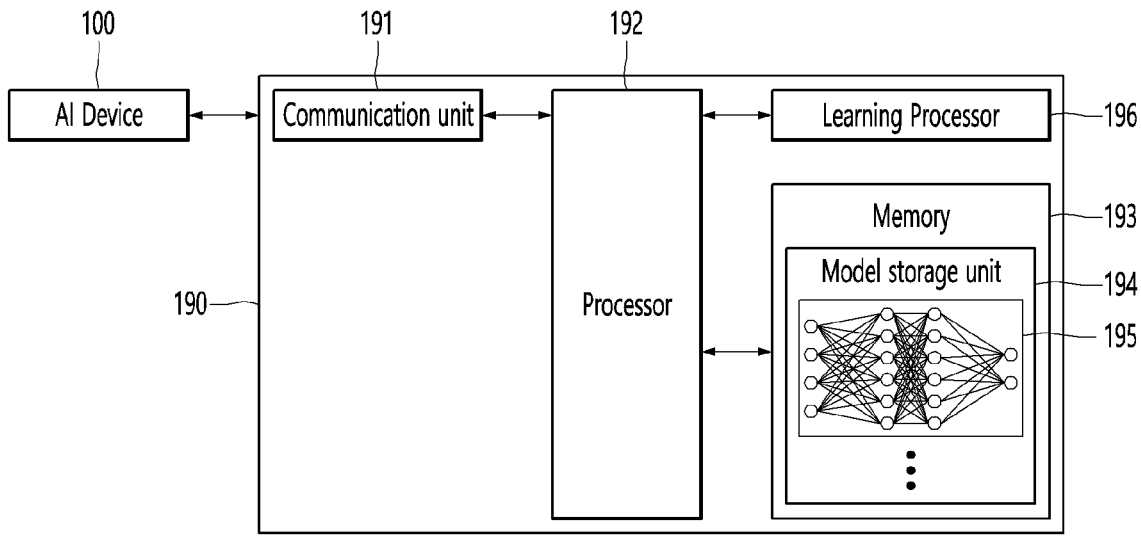

【Fig.3】
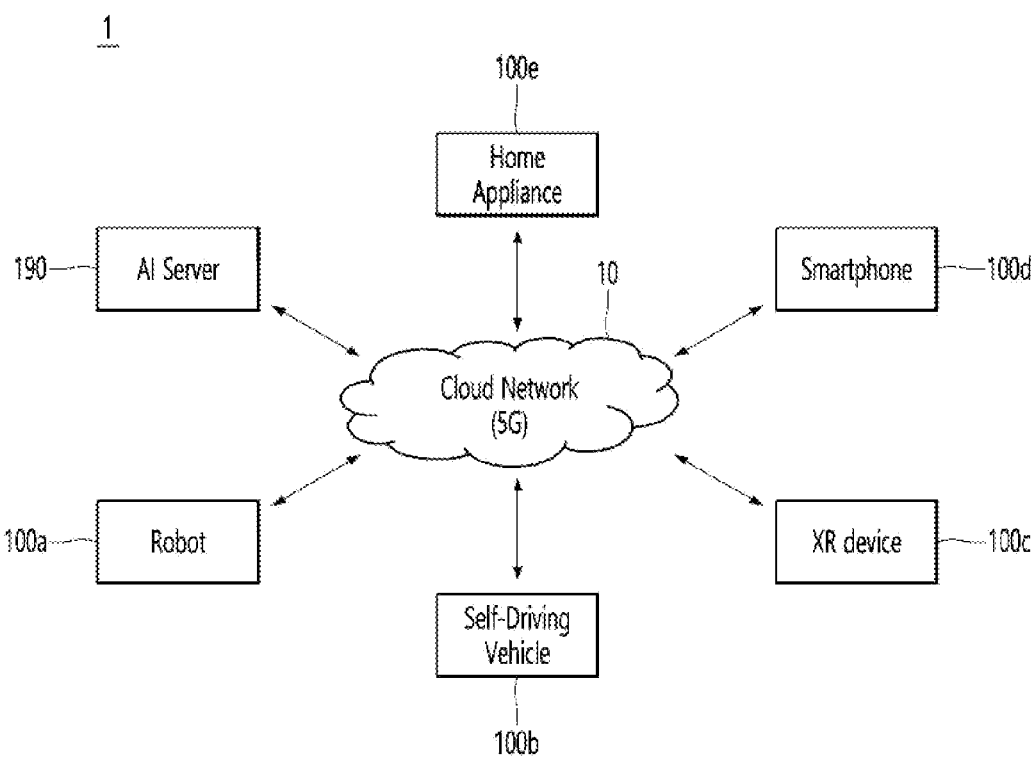

【Fig.4】
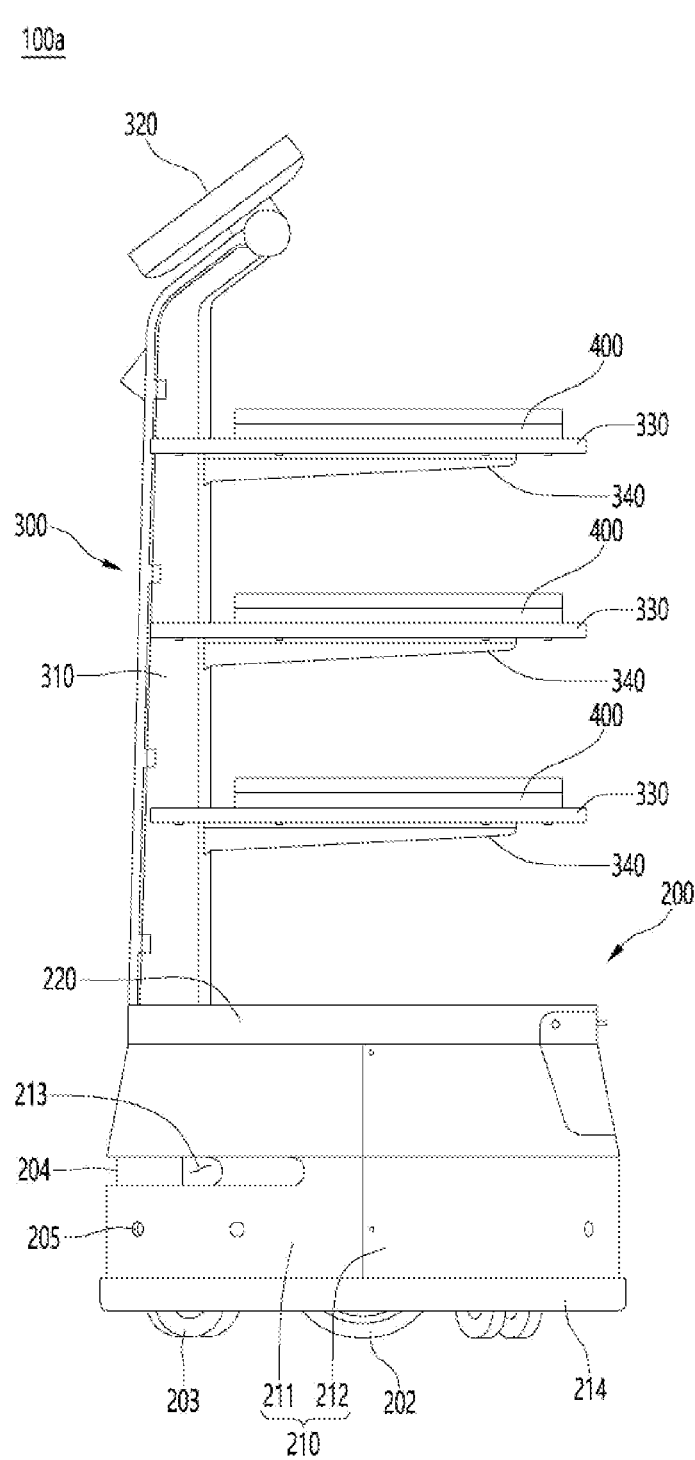

【Fig.5】
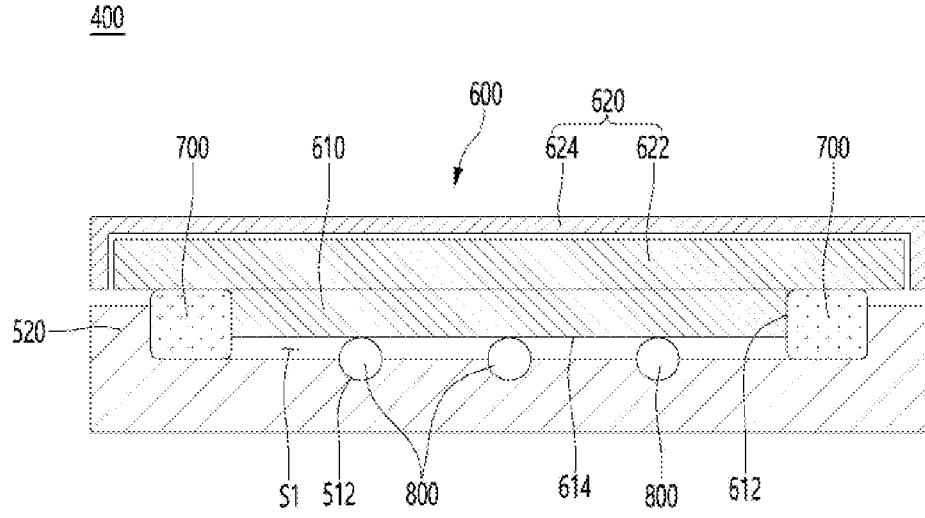

【Fig.6】
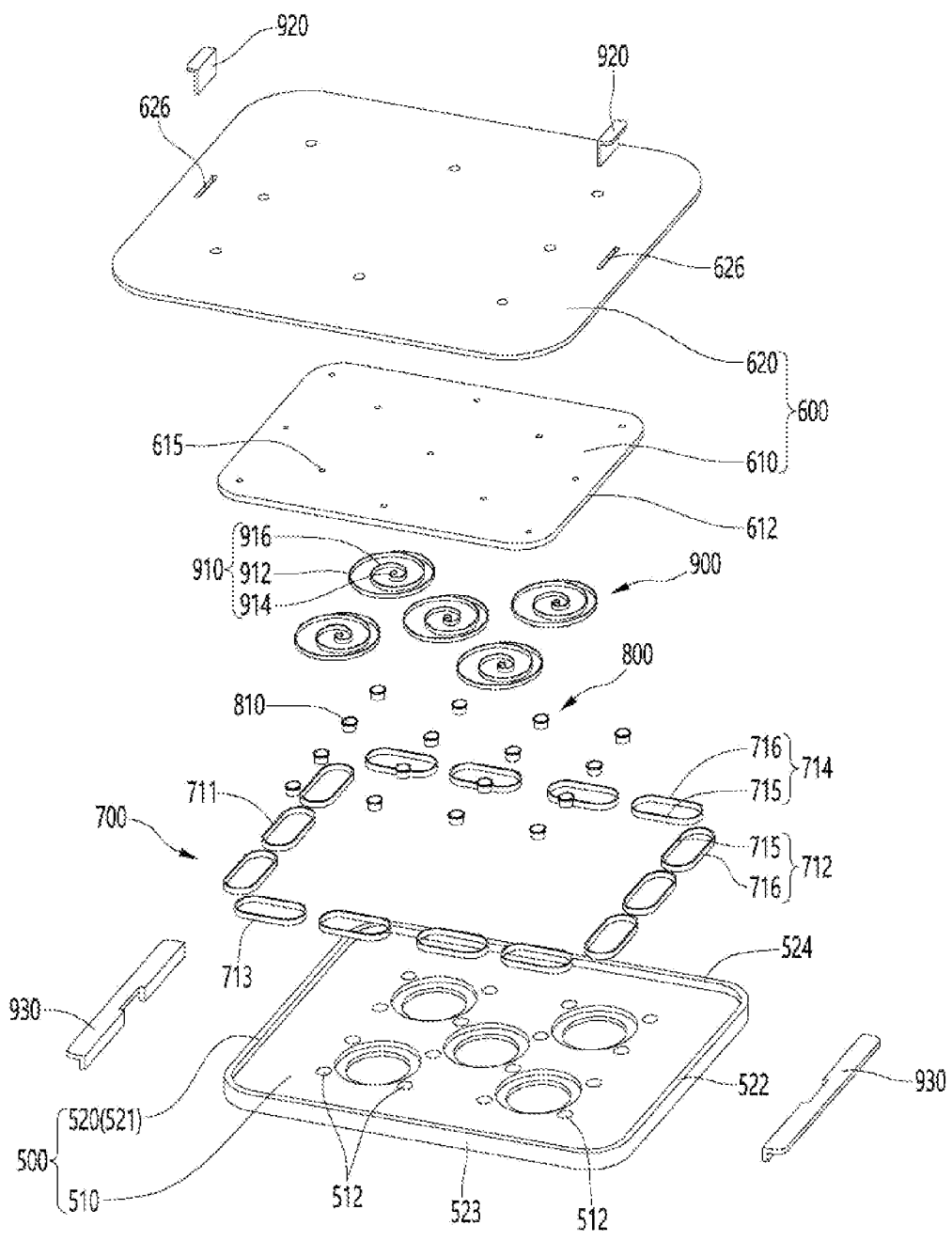

【Fig.7】
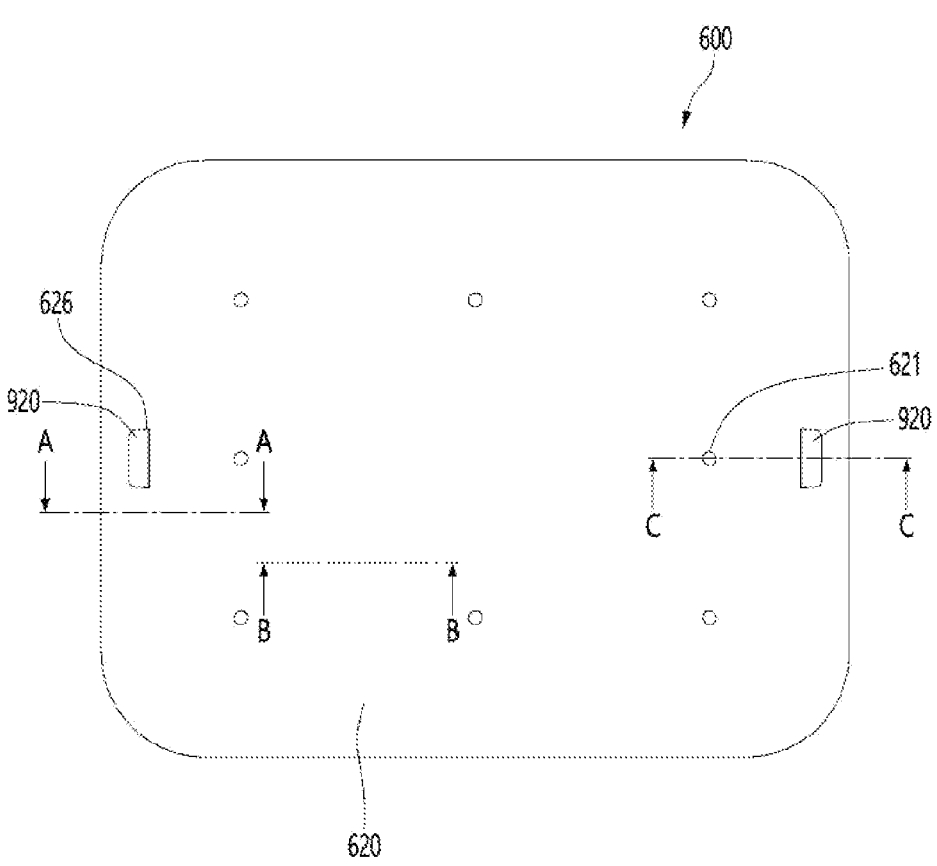

【Fig.8】
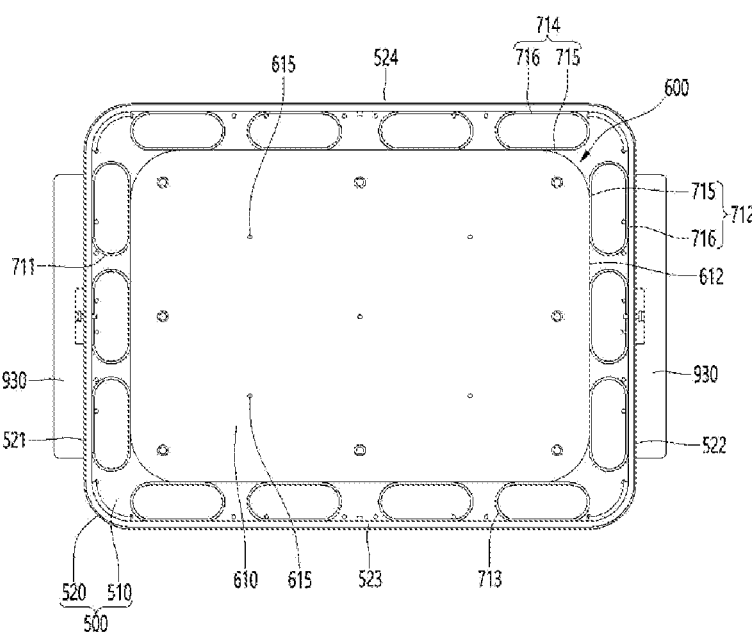
【Fig.9】
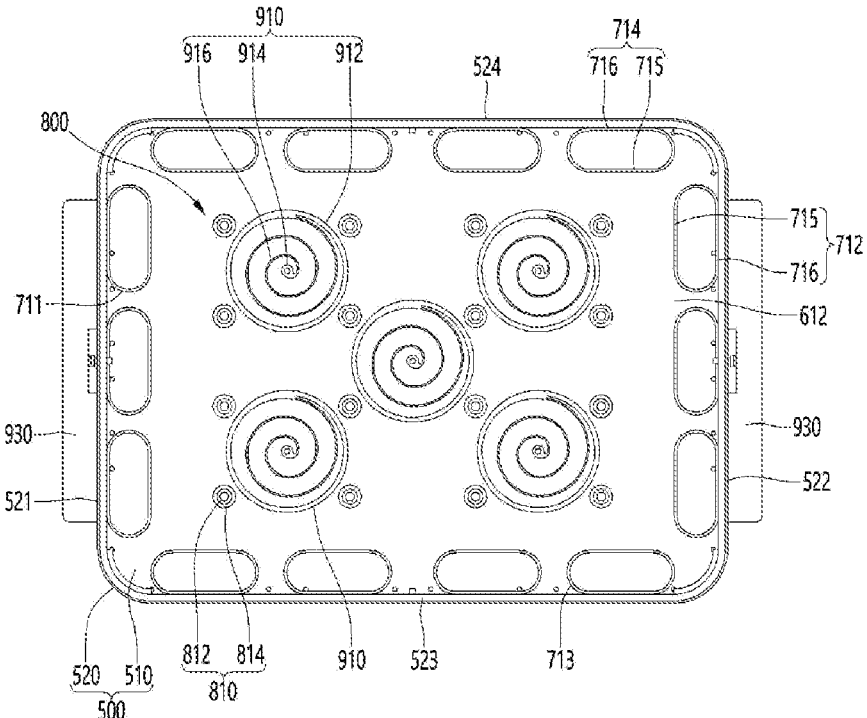

【Fig.10】
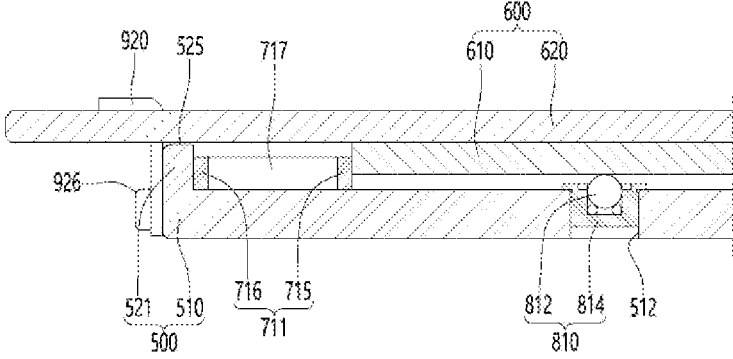
【Fig.11】
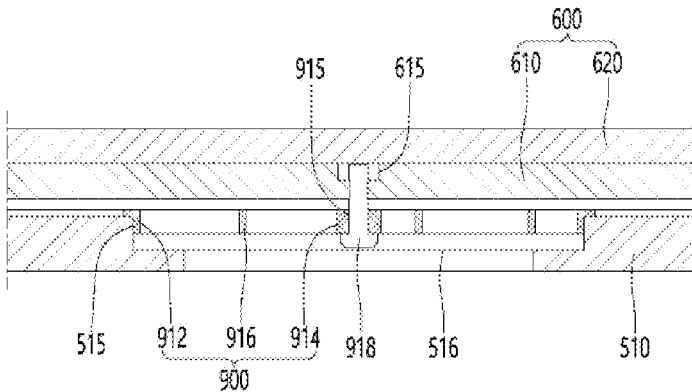
【Fig.12】
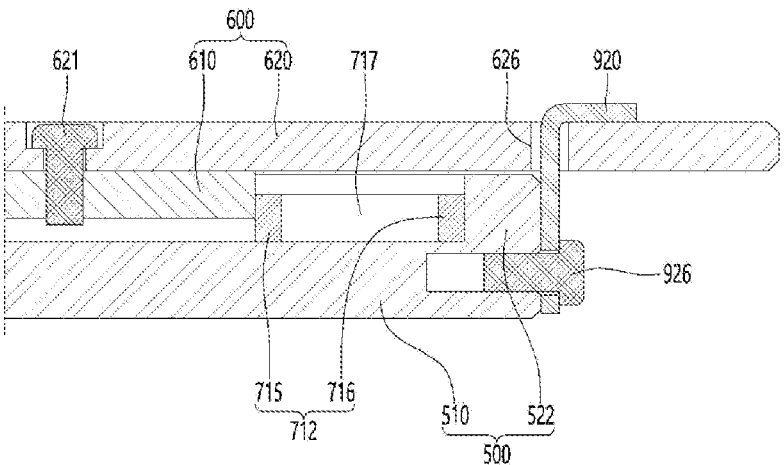

【Fig.13】
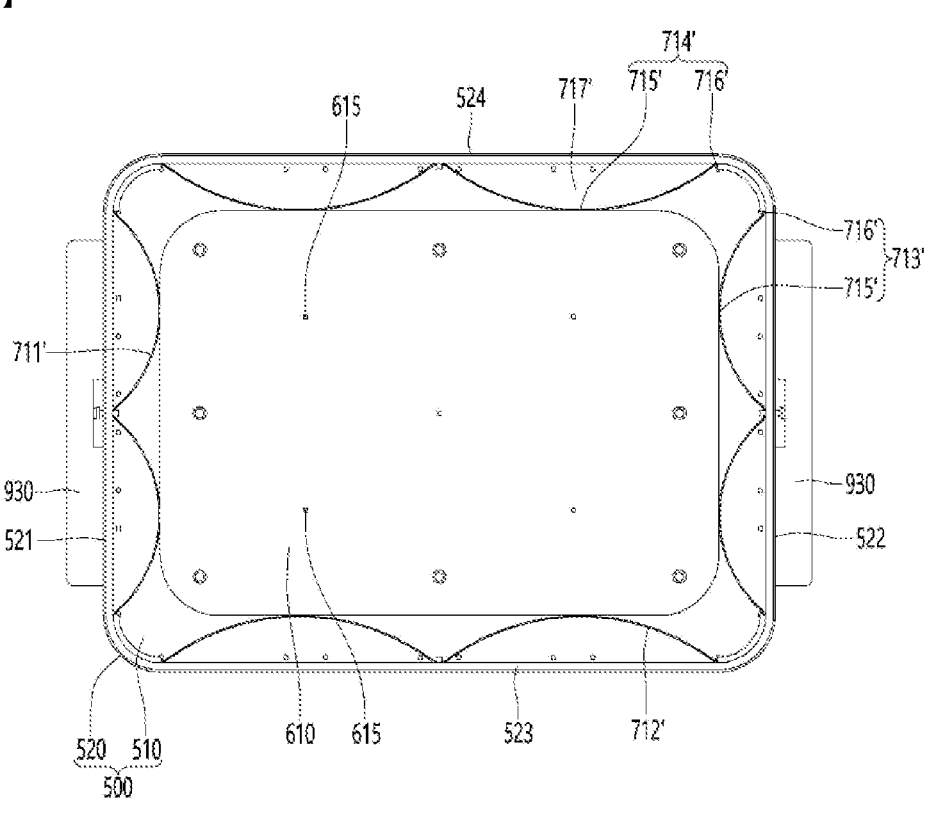
【Fig.14】

【Fig.15】
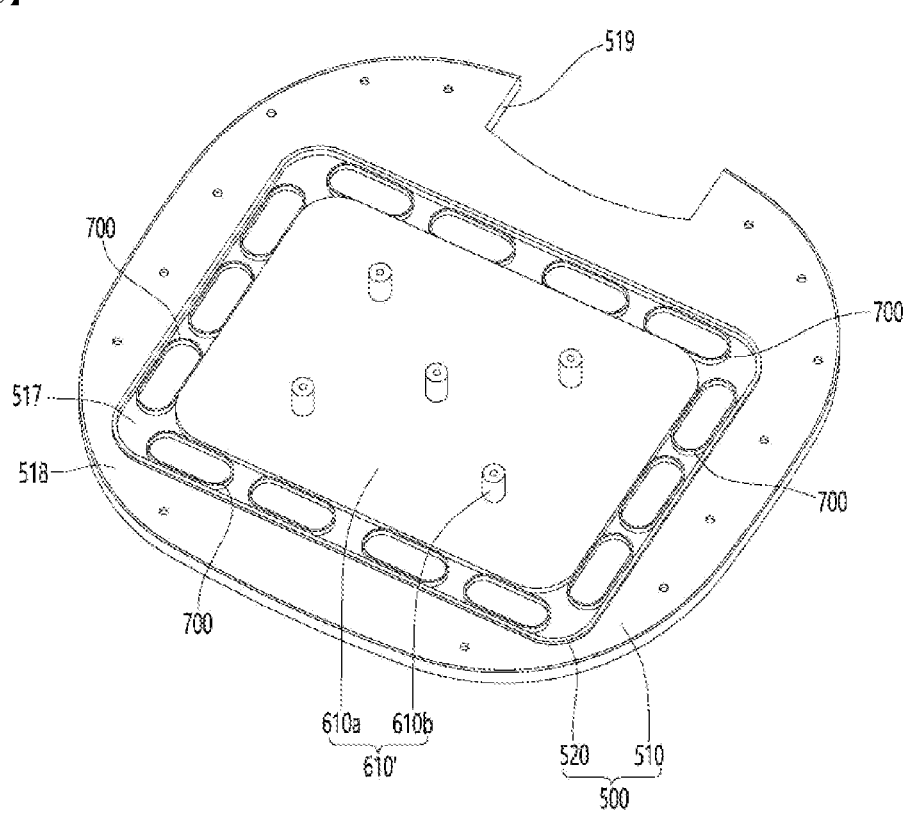
【Fig.16】
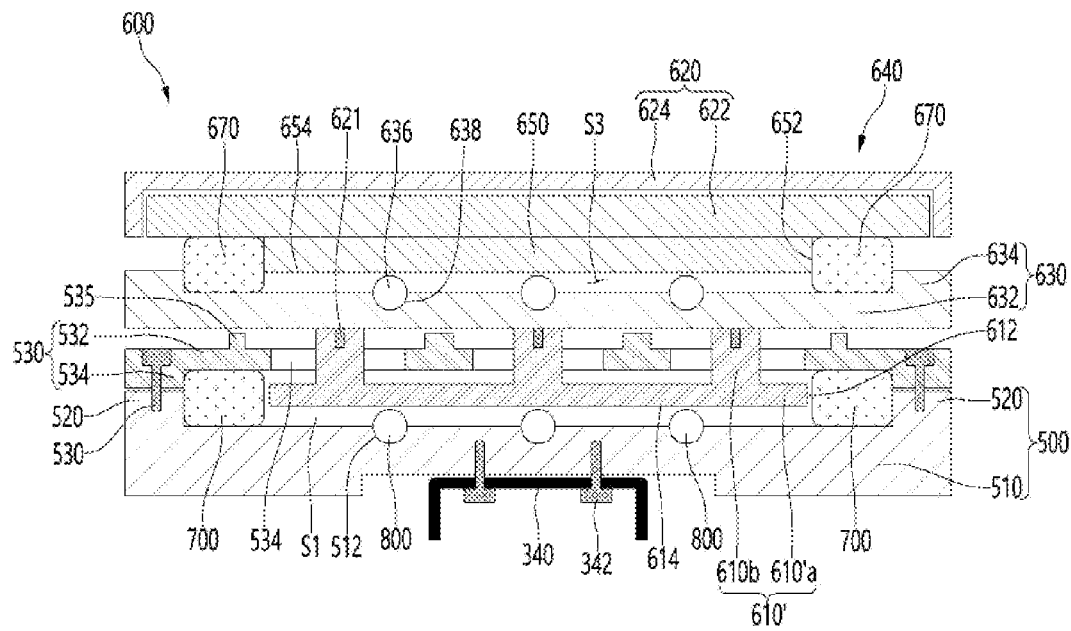

TRAY AND ROBOT HAVING SAME

CROSS-REFERENCE TO RELATED APPLICATION(S)

This application is the National Stage filing under 35 U.S.C. 371 of International Application No. PCT/KR2020/010260, filed on Aug. 4, 2020, the contents of which are all incorporated by reference herein in its entirety.

TECHNICAL FIELD

The present invention relates to a tray and a robot having the same.

BACKGROUND ART

In order to take on a part of factory automation, robots have been developed for industrial use. In recent years, the field of application of robots has been further expanded, and not only medical robots and aerospace robots, but also robots that can be used in daily life are being developed.

These robots for everyday life provide specific services (e.g., shopping, serving, talking, cleaning, etc.) in response to a user's command.

However, existing robots for everyday life are designed to provide only specific services, and thus there is a problem in that utilization is not high, compared to the cost invested in developing the robots.

Accordingly, the need for a robot capable of providing various services has recently emerged.

An example of such a robot may carry a container containing liquid food such as noodles or soup. The container may be placed on a tray provided in the robot, and the robot may be carried to a customer or service provider.

Korean Patent Laid-Open No. 10-2020-0085658 A (published on Jul. 15, 2020) discloses a robot including a tray, a main body having a tray space in which the tray is accommodated and a tray entrance formed therein, a tray moving mechanism for moving at least a portion of the tray out of the tray entrance or moving the entire tray to the tray space, a door for opening or closing the tray entrance, and a door driving mechanism connected to the door to open or close the door.

DISCLOSURE OF INVENTION

Technical Problem

A robot according to the related art may accelerate, decelerate, and turn rapidly while traveling, and when a container containing liquid food is placed on a tray, the liquid food may overflow.

An object of the present invention is to provide a tray capable of minimizing overflow of liquid food in a container while carrying a container containing liquid food, and a robot having the tray.

Technical Solution

A tray according to an embodiment of the present invention may include: a housing having a lower plate and a perimeter wall provided on the lower plate and having a space formed inside the perimeter wall; a stabler including a moving body movably accommodated in the space; and a plurality of dampers disposed between an edge of the moving body and the perimeter wall.

A robot including the tray according to the present embodiment may include a mobile robot provided with a driving wheel; a frame disposed on the mobile robot; and a tray disposed on the frame.

The frame may include a shelf. For example, the housing may be seated on the shelf or coupled to the shelf. As another example, the housing may be coupled to the frame.

For example, the stabler may further include a top tray disposed on the moving body to cover the space.

The tray may further include an inner cover disposed between the top tray and the housing to cover a space between the edge of the moving body and the perimeter wall.

The moving body may include a lower body including an edge, and a protruding body protruding from an upper surface of the lower body and connected to the top tray. An opening through which the protruding body passes may be formed in the inner cover.

The inner cover may include a hollow rib protruding upward from a circumference of the opening.

As another example, the stabler may include: a moving housing including an inner plate disposed on the moving body to cover the space, and an upper perimeter wall provided on the inner plate, wherein an upper space is formed inside the upper perimeter wall; and an upper stabler including an upper moving body movably accommodated in the upper space; and a plurality of upper dampers disposed between an edge of the upper moving body and the upper perimeter wall.

The upper stabler may a top tray disposed on the moving housing to cover the upper space.

For example, the damper may include an elastic member, a cross-section of which has a closed loop shape.

As another example, the damper may include a plate spring having a moving body contact portion coming into contact with an edge of the moving body and a perimeter wall contact portion coming into contact with an inner surface of the perimeter wall.

The tray may further include a rolling member which is installed in the lower plate and on which the moving body is seated.

The tray may further include a lower spring disposed on the lower plate and fastened to the moving body.

The lower spring may include a spiral spring disposed between the lower plate and a lower surface of the moving body and connected to the moving body.

The spiral spring may include: an outer circumference fitted to the lower plate; a central portion spaced apart from the outer circumference and provided with a hole through which a fastening member fastened to the moving body passes; and a bridge connecting the outer circumference and the central portion and having a spiral shape.

The lower plate may be provided with an opening through which the fastening member passes at a lower side of the lower spring.

The tray may further include a locker coupled to the housing to lock the moving body.

Advantageous Effects

According to an embodiment of the present invention, a stabler can move on a housing, a plurality of dampers may absorb shock by reducing instantaneous acceleration of a moving body, and the overflow of liquid food in a container can be minimized.

In addition, a top tray disposed above the moving body can cover a space, thereby minimizing contamination inside the tray.

In addition, when the top tray is contaminated due to long-term use, only the top tray can be replaced without replacing the entire tray.

In addition, the inner cover can cover a space between the edge of the moving body and a perimeter wall to minimize penetration of foreign materials and to keep the tray clean.

In addition, the inner cover can minimize any separation and loss of the damper.

In addition, a hollow rib of the inner cover can prevent liquid food from penetrating into an opening formed in the inner cover.

In addition, when the moving housing of the stabler can move together with the moving body, the housing can move in the upper moving body of the upper stabler, and a plurality of upper dampers can decelerate the upper moving body, the upper stabilizer can be decelerated in multiple stages by a plurality of dampers and a plurality of upper dampers, and the deceleration effect of the tray can be increased.

In addition, since the moving body is supported by a rolling member and spaced apart from the lower plate, noise generation and abrasion of the moving body can be minimized.

In addition, the lower spring fastened to the moving body can prevent the moving body from being arbitrarily separated and cushion the moving body.

BRIEF DESCRIPTION OF DRAWINGS

FIG. 1 is a view illustrating an AI device constituting a robot system according to an embodiment.

FIG. 2 is a view illustrating an AI server of a robot system according to an embodiment.

FIG. 3 is a view illustrating an AI system to which a robot system according to an embodiment is applied.

FIG. 4 is a side view of a robot including a tray according to the present embodiment.

FIG. 5 is a view of the tray illustrated in FIG. 4.

FIG. 6 is an exploded perspective view illustrating an example of a tray according to an embodiment of the present invention.

FIG. 7 is a plan view of the tray illustrated in FIG. 6.

FIG. 8 is a plan view in which a top tray illustrated in FIG. 7 is separated.

FIG. 9 is a plan view in which a moving body illustrated in FIG. 8 is separated.

FIG. 10 is a cross-sectional view taken along line A-A illustrated in FIG. 7.

FIG. 11 is a cross-sectional view taken along line B-B illustrated in FIG. 7.

FIG. 12 is a cross-sectional view taken along line C-C illustrated in FIG. 7.

FIG. 13 is a plan view when a plate spring is disposed instead of an elastic member illustrated in FIG. 8.

FIG. 14 is a view illustrating another example of a tray according to an embodiment of the present invention.

FIG. 15 is a perspective view in which a top tray of the tray illustrated in FIG. 14 is separated.

FIG. 16 is a view illustrating further another example of a tray according to an embodiment of the present invention.

MODE OF DISCLOSURE

Hereinafter, detailed embodiments will be described in detail with reference to the accompanying drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

FIG. 1 illustrates an AI device including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communicator 110, an input interface 120, a learning processor 130, a sensor 140, an output interface 150, a memory 170, and a processor 180.

The communicator 110 may transmit and receive data to and from external devices such as other AI devices 100a to 100e and the AI server 190 by using wire/wireless communication technology. For example, the communicator 110 may transmit and receive sensor information, a user input, a learning model, and a control signal to and from external devices.

The communication technology used by the communicator 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 196 of the AI server 190.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 196 of the AI server 190, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 190. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server connected to a robot according to an embodiment of the present invention.

Referring to FIG. 2, the AI server 190 may refer to a device that learns an artificial neural network by using a machine learning algorithm or uses a learned artificial neural network. The AI server 190 may include a plurality of servers to perform distributed processing, or may be defined as a 5G network. At this time, the AI server 190 may be included as a partial configuration of the AI device 100, and may perform at least part of the AI processing together.

The AI server 190 may include a communicator 191, a memory 193, a learning processor 196, a processor 192, and the like.

The communicator 191 can transmit and receive data to and from an external device such as the AI device 100.

The memory 193 may include a model storage unit 531. The model storage unit 531 may store a learning or learned model (or an artificial neural network 531_a_) through the learning processor 196.

The learning processor 196 may learn the artificial neural network 531_a_ by using the learning data. The learning model may be used in a state of being mounted on the AI server 190 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 193.

The processor 192 may infer the result value for new input data by using the learning model and may generate a response or a control command based on the inferred result value.

FIG. 3 illustrates an AI system according to an embodiment of the present invention.

Referring to FIG. 3, in the AI system 1, at least one of an AI server 190, a robot 100_a_, a self-driving vehicle 100_b_, an XR device 100_c_, a smartphone 100_d_, or a home appliance 100_e_ is connected to a cloud network 10. The robot 100_a_, the self-driving vehicle 100_b_, the XR device 100_c_, the smartphone 100_d_, or the home appliance 100_e_, to which the AI technology is applied, may be referred to as AI devices 100_a_ to 100_e_.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100_a_ to 100_e_ and 190 configuring the AI system 1 may be connected to each other through the cloud network 10. In particular, each of the devices 100_a_ to 100_e_ and 190 may communicate with each other through a base station, but may directly communicate with each other without using a base station.

The AI server 190 may include a server that performs AI processing and a server that performs operations on big data.

The AI server 190 may be connected to at least one of the AI devices constituting the AI system 1, that is, the robot 100_a_, the self-driving vehicle 100_b_, the XR device 100_c_, the smartphone 100_d_, or the home appliance 100_e_ through the cloud network 10, and may assist at least part of AI processing of the connected AI devices 100_a_ to 100_e_.

At this time, the AI server 190 may learn the artificial neural network according to the machine learning algorithm instead of the AI devices 100_a_ to 100_e_, and may directly store the learning model or transmit the learning model to the AI devices 100_a_ to 100_e_.

At this time, the AI server 190 may receive input data from the AI devices 100_a_ to 100_e_, may infer the result value for the received input data by using the learning model, may generate a response or a control command based on the inferred result value, and may transmit the response or the control command to the AI devices 100_a_ to 100_e_.

Alternatively, the AI devices 100_a_ to 100_e_ may infer the result value for the input data by directly using the learning model, and may generate the response or the control command based on the inference result.

Hereinafter, various embodiments of the AI devices 100_a_ to 100_e_ to which the above-described technology is applied will be described. The AI devices 100_a_ to 100_e_ illustrated in FIG. 3 may be regarded as a specific embodiment of the AI device 100 illustrated in FIG. 1.

<AI+Robot>

The robot 100_a_, to which the AI technology is applied, may be implemented as a guide robot, a carrying robot, a cleaning robot, a wearable robot, an entertainment robot, a pet robot, an unmanned flying robot, or the like.

The robot 100_a_ may include a robot control module for controlling the operation, and the robot control module may refer to a software module or a chip implementing the software module by hardware.

The robot 100_a_ may acquire state information about the robot 100_a_ by using sensor information acquired from various kinds of sensors, may detect (recognize) surrounding environment and objects, may generate map data, may determine the route and the travel plan, may determine the response to user interaction, or may determine the operation.

The robot 100_a_ may use the sensor information acquired from at least one sensor among the lidar, the radar, and the camera so as to determine the travel route and the travel plan.

The robot 100_a_ may perform the above-described operations by using the learning model composed of at least one artificial neural network. For example, the robot 100_a_ may recognize the surrounding environment and the objects by using the learning model, and may determine the operation by using the recognized surrounding information or object information. The learning model may be learned directly from the robot 100a or may be learned from an external device such as the AI server 190.

At this time, the robot 100a may perform the operation by generating the result by directly using the learning model, but the sensor information may be transmitted to the external device such as the AI server 190 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

FIG. 4 is a side view of a robot including a tray according to the present embodiment.

A robot 100a including a tray may include a mobile robot 200, a frame 300, and a tray 400.

The mobile robot 200 may be a main body of the robot 100a. The mobile robot 200 may be an autonomous robot capable of autonomously traveling to a destination.

A driving wheel 202 may be disposed in the mobile robot 200. The driving wheel 202 may be disposed below the mobile robot 200.

The mobile robot 200 may be provided with a caster 203. The caster 203 may be disposed below the mobile robot 200 and may assist the traveling of the robot 100a.

The mobile robot 200 may include a lower housing 210, a base plate 214, and a body frame 220.

The lower housing 210 may form the outer appearance of the mobile robot 200. The lower housing 210 may form the outer appearance of the circumference of the mobile robot 200. The upper surface of the lower housing 210 may be opened.

The lower housing 210 may include a combination of a plurality of members. The lower housing 210 may include a front housing 211 and a rear housing 212, and fastening and separating work of the lower housing 210 may be facilitated.

The front housing 211 may have a shape curved convexly toward the front, and the rear housing 212 may have a shape curved convexly toward the rear. The rear end of the front housing 211 and the front end of the rear housing 212 may come into contact with each other. Outer surfaces of the front housing 211 and the rear housing 212 may be continuously connected.

A lidar 204 may be provided on the mobile robot 200. An opening 213 in which the lidar 204 is disposed may be formed in the lower housing 210. The opening 213 may be opened toward the front and may be elongated in the left-and-right direction. The lidar 204 may detect an obstacle or a person located in front of the robot 100a through the opening 213.

A plurality of ultrasonic sensors 205 may be provided in the mobile robot 200. The plurality of ultrasonic sensors 205 may be spaced apart from each other in the circumferential direction of the mobile robot 200. A plurality of openings in which the ultrasonic sensors 205 are disposed may be formed on the outer circumference of the lower housing 210. The respective ultrasonic sensors 205 may detect an object around the robot 100a.

The frame 300 may be provided in the mobile robot 200. The frame 300 may protrude upward from the front of the mobile robot 200. The frame 300 may include a front frame 310 disposed at the front of the mobile robot 200. A display 320 to be described below may be disposed above the front frame 310. The display 320 may constitute a head of the robot 100a, and the front frame 310 may constitute a neck body of the robot 100a.

The frame 300 may include a combination of a plurality of members. The front frame 310 may be manufactured separately from the mobile robot 200 and then coupled to the upper front portion of the mobile robot 200. A portion of the front frame 310 may be formed integrally with the mobile robot 200, and may be formed to protrude upward from the front of the mobile robot 200.

The front frame 310 may be formed substantially vertically. The front frame 310 may be formed to gradually become thinner toward the upper side. The rear surface of the front frame 310 may be vertical.

The frame 300 may include a shelf 330. A plurality of shelves 330 may be provided in the front frame 310.

A pedestal 340 may extend rearward from the front frame 310.

The pedestal 340 may be a bracket connected to the front frame 310, and a connection portion connected to the front frame 310 may be formed at a front portion thereof.

The shelf 330 may be disposed above the pedestal 340.

The tray 400 may be a module-type tray separate from the shelf 330. After the tray 400 is manufactured separately from the shelf 330, the tray 400 may be put on the shelf 330 and used, as illustrated in FIG. 4. When the tray 400 is a module-type tray, the tray 400 may be seated on the shelf 330 and may be separated from the shelf 330 when a user holds the tray 400 and lifts the tray 400 upward.

The tray 400 may be a mount-type tray. The tray 400 may be fixedly mounted on the shelf 330, or may be mounted instead of the shelf 330.

Hereinafter, the module-type tray will be described first. FIG. 5 is a view of the tray illustrated in FIG. 4.

The tray 400 may be disposed on the frame (see 300 of FIG. 4). The tray 300 may include a housing 500, a stabler 600, and a damper 700.

The housing 500 may be seated on the shelf 330, or may be coupled to the shelf 330. The housing 500 may be placed on the upper surface of the shelf 330 and seated on the shelf 330. The housing 500 may also be coupled to the shelf 330 by using fastening members such as screws or pins.

The housing 500 may include a lower plate 510 and a perimeter wall 520 provided on the lower plate 520.

The housing 500 may form the outer appearance of the bottom of the tray 400, and the lower plater 510 may be seated on the upper surface of the shelf 330.

A space S1 may be formed inside the housing 500. The space S1 may be formed in the upper surface of the housing 500. The space S1 may be formed inside the perimeter wall 520 of the housing 500.

The space S1 may be a stabler accommodating space in which all or part of the stabler 600 is movably accommodated, and may be a damper accommodating space in which the damper 700 is accommodated.

The stabler 600 may include a moving body 610. The moving body 610 may be movably accommodated in the space S1.

The size of the moving body 610 may be smaller than the size of the space S1. The overall shape of the moving body 610 may be the same as the overall shape of the space S1.

The stabler 600 may be defined as a portion on which a container containing liquid food is placed, and may support the container so as to minimize shaking of the liquid food.

The stabler 600 may be formed of a single member, or may be formed of a combination of a plurality of members.

The stabler 600 may further include a top tray 620 disposed on the moving body 610. The top tray 620 may cover the space S1. The top tray 620 may cover the space S1 at the upper side of the space S1.

The size of the top tray 620 may be larger than the size of the moving body 610 and the size of the space S1. The top tray 620 may prevent foreign materials such as dust or food from penetrating into the space S1. The top tray 620 may protect the moving body 610 from above the moving body 610. The top tray 620 may protect the damper 700.

The top tray 620 may be formed of a single member, or may be formed of a combination of a plurality of members. The top tray 620 may include a tray body 622 formed of a rigid body having a predetermined rigidity and a skin body 624 covering the upper surface of the tray body 622.

The skin body 624 may include an elastic material such as silicone.

On the other hand, the top tray 620 may also be integrated with the moving body 610, the moving body 610 having a smaller size than the space S1 is inserted into the space S1, and the top tray 620 having a larger size than the space S1 may cover the space S1 from the upper side of the moving body 610.

The damper 700 may prevent the moving body 610 and the perimeter wall 520 from colliding with each other, and may prevent the moving body 610 from rapidly moving within the perimeter wall 520. The damper 700 may minimize the moving body 610 from coming into contact with the perimeter wall 520 between the movable body 610 and the perimeter wall 520.

The damper 700 may be disposed between four corners of the moving body 610 and the inner surface of the perimeter wall 520. A plurality of dampers 700 may be provided. The damper 700 may be disposed between an edge 612 of the moving body 610 and the perimeter wall 520.

The damper 700 may be disposed to come into contact with each of the moving body 610 and the perimeter wall 520. The damper 700 may have a variable horizontal width (i.e., the front-and-rear width or the left-and-right width). When the moving body 610 moves within the space S1, the width of the damper 700 may be changed according to the moving direction of the moving body 610.

The damper 700 may be stretched to increase its width or compressed to decrease its width.

The damper 700 may be formed of an elastic member such as an elastically deformable rubber or a spring. There is no limitation in the kind of the damper 700 as long as the width can be deformed according to the movement of the moving body 610.

On the other hand, the tray 400 may include a supporter 800 installed in the housing 500 to support the moving body 610. The supporter 800 may be disposed on the lower plate 510. The supporter 800 may support the moving body 610 so that the moving body 610 is spaced apart from the lower plate 510.

A plurality of supporters 800 may be provided on the lower plate 510, and the plurality of supporters 800 may be spaced apart from each other in the horizontal direction.

The lower surface 614 of the moving body 610 may be placed on the supporter 800, and the lower surface 614 of the moving body 610 may be spaced apart from the upper surface of the lower plate 510 in the vertical direction.

The supporter 800 may include a rolling member accommodated in the lower plate 510. The rolling member may include a spherical ball or a cylindrical roller. The lower plate 510 may have a supporter accommodating portion 512 capable of accommodating the lower portion of the supporter 800.

The upper portion of the supporter 800 may be positioned above the supporter accommodating portion 512, and the ball or the roller accommodated in the supporter accommodating portion 512 may come into contact with the lower surface 614 of the moving body 610. When the moving body 610 moves, the ball or the roller may guide the moving body 610 while rolling within the supporter accommodating portion 512.

When the lower surface 614 of the moving body 610 is spaced apart from the upper surface of the lower plate 510, the load of the stabler 600 may be transferred to the lower plate 510 through the supporter 800. When the moving body 610 moves, there is no friction between the moving body 610 and the lower plate 510. When the moving body 610 moves, frictional noise may be minimized and abrasion of the moving body 610 may be minimized.

A plurality of trays 400 illustrated in FIG. 5 may be stacked and used. When the tray located above is the lower tray and the tray located above the lower tray is the upper tray, the housing 500 of the upper tray located above may be disposed and used on the top tray 620 of the lower tray located below. In this case, the plurality of trays 400 may be operated in multiple stages.

FIG. 6 is an exploded perspective view illustrating an example of the tray according to an embodiment of the present invention, FIG. 7 is a plan view of the tray illustrated in FIG. 6, FIG. 8 is a plan view in which a top tray illustrated in FIG. 7 is separated, and FIG. 9 is a plan view in which a moving body illustrated in FIG. 8 is separated.

FIG. 10 is a cross-sectional view taken along line A-A illustrated in FIG. 7, FIG. 11 is a cross-sectional view taken along line B-B illustrated in FIG. 7, and FIG. 12 is a cross-sectional view taken along line C-C illustrated in FIG. 7.

The housing 500 may have a rectangular shape in which four vertices are rounded as a whole.

The supporter 800 accommodated in the supporter accommodating portion 512 of the housing 500 may include a ball roller (see 810 of FIG. 10).

The ball roller 810 may include a rolling member 812 of a ball or a roller and a holder 814 in which the lower portion of the rolling member 812 is accommodated. The holder 814 may be inserted into the supporter accommodating portion 512 formed in the lower plater 510.

The supporter 800 is not limited to including both the rolling member 812 and the holder 814, and may also include the rolling member 812 accommodated in the supporter accommodating portion 512 of the housing 500. In this case, the rolling member 812 may be a bearing ball.

The perimeter wall 520 of the housing 500 includes a front wall 521 formed in the front portion of the lower plate 510, a rear wall 522 formed in the rear portion of the lower plate 510, a left wall 523 formed on the left side of the lower plate 510, and a right wall 524 formed on the right side of the lower plate 510.

The space S1 may be surrounded by the front wall 521, the rear wall 522, the left wall 523, and the right wall 524.

The moving body 610 may be formed to be smaller than the space S1 and may be inserted into the space S1.

The moving body 610 may be fastened to the top tray 620 with a fastening member (see 621 of FIG. 12) such as a screw.

The moving body 610 may be suspended from the lower surface of the top tray 620, and may be moved along with the top tray 620 when the top tray 620 moves.

The top tray 620 may be seated on the perimeter wall 520. The bottom surface of the top tray 620 may be seated on an upper end 525 of the perimeter wall 520.

The damper 700 may include an elastic member 710. For example, the cross-section of the elastic member 710 may have a closed loop shape.

The elastic member 710 may include a moving body contact portion 715 and a perimeter wall contact portion 716.

The moving body contact portion 715 may come into contact with the edge of the moving body 610. The perimeter wall contact portion 716 may come into contact with the inner surface of the perimeter wall 520.

A gap 717 may be formed between the moving body contact portion 715 and the perimeter wall contact portion 716. The moving body contact portion 715 and the perimeter wall contact portion 716 may be connected through a pair of connection portions. The moving body contact portion 715 and the perimeter wall contact portion 716 may be parallel if there is no external force.

When the moving body 610 moves, the elastic member 710 may be pressed by the moving body 610, the moving body contact portion 715 may be close to the perimeter wall contact portion 716, and the gap 717 may be reduced.

When the external force applied to the moving body 610 is removed, the elastic member 710 may be elastically restored so that the gap 717 becomes larger again, and may push the moving body 610.

A plurality of elastic members 710 may be provided. A plurality of elastic members 710 may be disposed along the edge of the moving body 610. The plurality of elastic members 710 may include a front elastic member 711, a rear elastic member 712, a left elastic member 713, and a right elastic member 714.

The front elastic member 711 may be disposed between the front wall 521 and the front end of the moving body 610. A plurality of front elastic members 711 may be arranged in a row in the left-and-right direction.

The front elastic member 712 may be disposed between the rear wall 522 and the rear end of the moving body 610. A plurality of rear elastic members 712 may be arranged in a row in the left-and-right direction.

The left elastic member 713 may be disposed between the left wall 523 and the left end of the moving body 610. A plurality of left elastic members 713 may be arranged in a row in the front-and-back direction.

The right elastic member 714 may be disposed between the right wall 524 and the right end of the moving body 610. A plurality of right elastic members 714 may be arranged in a row in the front-and-back direction.

The front elastic member 711, the rear elastic member 712, the left elastic member 713, and the right elastic member 714 have different positions and may be formed in the same structure.

When the robot 100a suddenly starts, the container placed on the stabler 600 and the moving body 610 may move away from the front wall 521 and approach the rear wall 522 due to inertia.

When the moving body 610 approaches the rear wall 522, the moving body 610 may press the rear elastic member 712. The rear elastic member 712 may absorb shock as the moving body contact portion 715 approaches the perimeter wall contact portion 716, and rapid movement of the moving body 610 may be restricted.

Collision between the moving body 610 and the rear wall 522 may be minimized, and overflow of liquid food contained in the container may be minimized.

On the other hand, when the robot 100*a* brakes suddenly while moving forward, the container placed on the stabler 600 and the moving body 610 may move away from the rear wall 522 and approach the front wall 521 due to inertia.

When the moving body 610 approaches the front wall 521, the moving body 610 may press the front elastic member 711. The front elastic member 711 may absorb shock as the moving body contact portion 715 approaches the perimeter wall contact portion 716, and rapid movement of the moving body 610 may be restricted.

Collision between the moving body 610 and the front wall 521 may be minimized, and overflow of liquid food contained in the container may be minimized.

On the other hand, the tray 400 may further include a lower spring 900. The lower spring 900 may be disposed on the lower plate 510 and fastened to the moving body 610.

The lower spring 900 may be connected to return the moving body 610 to an original position while restricting rapid movement of the moving body 610.

One side of the lower spring 900 may be supported by the lower plate 510 and the other side of the lower spring 900 may be connected to the moving body 610.

A plurality of lower springs 900 may be provided. It is preferable that the lower spring 900 can be stretched in all directions of 360 degrees in the horizontal direction.

The lower spring 900 may be disposed between the lower plate 510 and the lower surface of the moving body 610. The lower spring 900 may include a spiral spring 910 connected to the moving body 610.

As illustrated in FIGS. 6 and 11, the lower spring 900 may include an outer circumference 912, a central portion 914, and a bridge 916.

The outer circumference 912 may be annular. The outer circumference 912 may be fitted to the lower plate 510.

The lower plate 510 may have a hollow portion 515 into which the outer circumference 912 may be inserted.

The central portion 914 may be spaced apart from the outer circumference 912. A hole 915 through which fastening member 918 passes may be formed in the central portion 914.

After passing through the hole 915 of the central portion 914, the fastening member 918 may be fastened to a fastening hole 615 formed in the lower body 610.

The bridge 916 connects the outer circumference 912 and the central portion 914 and may have a spiral shape.

The bridge 916 may allow the central portion 914 to move within the outer circumference 912.

An opening 516 through which the fastening member 918 passes may be formed at the lower side of the lower spring 900 in the lower plate 510. The opening 516 may have a smaller size than the hollow portion 515 and may be formed below the hollow portion 515.

The fastening member 918 may be fastened to the fastening hole 615 of the moving body 610 after sequentially passing through the opening 516, the hollow portion 515, and the central portion 914.

When the moving body 610 moves, the central portion 914 of the lower spring 900 may be moved together with the moving body 610. When the central portion 914 moves, the bridge 916 may restricts the rapid movement of the moving body 610 while being elastically deformed, and the moving body 610 may be decelerated.

When the external force applied to the moving body 610 is removed, the bridge 916 may be elastically restored. The lower sprint 900 may help the moving body 610 return to an original position.

The tray 400 may include a locker 920 for locking the moving body 610. The locker 920 may fasten the stabler 600 to the housing 500 so that the stabler 600 moves together with the housing 500.

The locker 920 may be fixed by fastening a screw 926 to the housing 510. A locker through-hole 626 through which the locker 920 passes may be formed in the stabler 600, particularly the top tray 620. In the top tray 620, the circumferential portion of the locker through-hole 626 may be horizontally hung on the locker 920 in which the screw 926 is fastened to the housing 510, and the top tray 620 may be hung on the housing 510.

When the container containing liquid food is placed on the tray 400, particularly the top tray 620, it is preferable that the stabler 600 is moved separately from the housing 500 in order to prevent overflow of liquid food. However, the stabler 600 may be locked by the locker 920 when the container containing liquid food is not placed on the tray 400, particularly the top tray 620.

The tray 400 may include a handle 930 that a user can hold by hand. The handle 930 may be coupled to the housing 500. When viewed from above the top tray 620, the handle 930 may be formed in a size invisible to the top tray 620. The handle 930 may be spaced apart from the top tray 620 in the vertical direction. The handle 930 may overlap the top tray 620 in the vertical direction.

FIG. 13 is a plan view when a plate spring is disposed instead of the elastic member illustrated in FIG. 8.

The damper 700 may include a plate spring 710'. The plate spring 710' may be a flat spring or an elastic band.

The plate spring 710' may have a moving body contact portion 715' coming into contact with the edge 612 of the moving body 610 and a perimeter wall contact portion 716' coming into contact with the inner surface of the perimeter wall 520.

The plate spring 710' may be formed with a center convex toward the moving body, and a portion coming into contact with the moving body 610 among the convex portions toward the moving body may be the moving body contact portion 715'.

A pair of perimeter wall contact portions 716' may be provided in the plate spring 710'.

A gap 717' may be formed between the moving body contact portion 715' and the perimeter wall 520.

The plate spring 710' may be convex toward the moving body 610 when there is no external force. When the moving body 610 moves, the plate spring 710' may be pressed by the moving body 610. The moving body contact 715 may approach the perimeter wall 520, and the gap 717' may be reduced.

When the external force applied to the moving body 610 is removed, the plate spring 710' may be elastically restored so that the gap 717 becomes larger again, and may push the moving body 610.

A plurality of plate springs 710' may be provided. A plurality of springs 710 may be disposed along the edge of the moving body 610. The plurality of springs 710 may include a front spring 711', a rear spring 712', a left spring 713', and a right spring 714'.

The front spring 711' may be disposed between the front wall 521 and the front end of the moving body 610. A plurality of front springs 711' may be arranged in a row in the left-and-right direction.

The rear spring 712' may be disposed between the rear wall 522 and the rear end of the moving body 610. A plurality of rear springs 712' may be arranged in a row in the left-and-right direction.

The left spring 713' may be disposed between the left wall 523 and the left end of the moving body 610. A plurality of the left springs 713' may be arranged in a row in the front-and-back direction.

The right spring 714' may be disposed between the right wall 524 and the right end of the moving body 610. A plurality of right springs 714' may be arranged in a row in the front-and-back direction.

The positions of the front spring 711', the rear spring 712', the left spring 713', and the right spring 714' are different from each other, and may be formed in the same structure.

In the tray illustrated in FIG. 13, a spring, in particular, a plate spring 710' is installed instead of the elastic member 710 illustrated in FIG. 8. Since other configurations other than the plate spring 710' are the same as those of the tray illustrated in FIG. 8, the same reference numerals are used and a detailed description thereof is omitted.

FIG. 14 is a view illustrating another example of the tray according to an embodiment of the present invention.

The moving body 610' illustrated in FIG. 14 may include a lower body 610a and a protruding body 610b.

The lower body 610a may be accommodated in the space S1 formed inside the perimeter wall 520.

The lower body 610a may include an edge 612. The damper 700 may be disposed between the edge 612 of the lower body 610a and the inner surface of the circumferential surface 520, and may come into contact with the edge 612 of the lower body 610a.

The lower body 610a may include a lower surface 614 facing the lower plate 510. The lower surface 614 of the lower body 610 may be placed on the supporter 800 disposed on the lower plate 510 and supported by the supporter 800.

The protruding body 610b may protrude from the upper surface of the lower body 610a and may be connected to the top tray 620.

The fastening member 621 such as a screw for fastening the top tray 620 and the moving body 610' is not fastened to the lower body 610a of the moving body 610', but may be fastened to the protruding body 610' of the moving body 610'.

The lower body 610a of the moving body 610' may be spaced apart from the top tray 620 in the vertical direction.

The top tray 620 may have a distance S2 from the perimeter wall 520 in the vertical direction.

The tray may include an inner cover 530 disposed between the top tray 620 and the housing 500. The inner cover 530 may cover a space between the edge 612 of the moving body 610' and the perimeter wall 520.

The inner cover 530 may include a seating portion 531 and a cover portion 532.

The seating portion 531 may be seated at the upper end of the perimeter wall 520. The seating portion 531 may be fastened to the perimeter wall 520 with the fastening member 533 such as a screw.

The cover portion 532 may extend from the seating portion 531. The cover portion 532 may be spaced apart from the lower plate 510 in the vertical direction. The cover portion 532 may cover the space S1.

The inner cover 530 is larger than the moving body 610' and may prevent the moving body 610' accommodated in the space S1 from being removed.

The damper 700 may be accommodated between the lower plate 510 and the cover portion 532 and may be protected by the cover portion 532.

An opening 534 through which the protruding body 610b passes may be formed in the inner cover 530.

The inner cover 530 may include a hollow rib 535. The hollow rib 535 may protrude upward from the circumference of the opening 534.

The opening 534 and the hollow rib 535 may be formed in the cover portion 532.

The hollow rib 535 may be formed in a hollow shape to prevent liquid from penetrating into the space S1 along the upper surface of the cover portion 532. That is, the inside of the tray 400 may be kept clean.

The inner cover 530 configured as described above may minimize the penetration of foreign materials, such as liquid food or dust, into the space S1.

On the other hand, for example, the housing 500 may be placed on the shelf 330 illustrated in FIG. 4. As another example, the housing 500 may be disposed on the frame 300 instead of the shelf 330 illustrated in FIG. 4.

When the housing 500 is mounted instead of the shelf 330, the housing 500, particularly the lower plate 520, may be placed on the pedestal 340, and may be fastened to the pedestal 340 through the fastening member 342 such as a screw.

Among the configurations of another example of the tray 400 illustrated in FIG. 14, the same reference numerals are used for the same components as those of the tray illustrated in FIG. 5, and a detailed description thereof is omitted.

FIG. 15 is a perspective view in which the top tray of the tray illustrated in FIG. 14 is separated.

The housing 500 may be integrated with the frame 300 by being coupled to the frame 300 illustrated in FIG. 4.

In the housing 500, the perimeter wall 520 may protrude from the upper surface of the lower plate 510. The lower plate 510 may be divided into a central portion 517 and a circumferential portion 518 based on the perimeter wall 520.

The central portion 517 may form the space S1, and the upper damper 670 may be placed in the central portion 517.

In this case, the top tray 620 illustrated in FIG. 14 is formed to be smaller than the housing 500, and when the top tray 620 is connected to the moving body 610', the top tray 610 may not cover the circumferential portion 518.

An opening 519 surrounding the front frame (see 310 of FIG. 4) may be formed in the circumferential portion 518. The opening 519 may surround the rear surface and both left and right sides of the front frame 310.

The opening 519 may be molded to the front frame 310, and the housing 500 may be stably supported without tilting or sagging.

FIG. 16 is a view illustrating further another example of the tray according to an embodiment of the present invention.

A stabler 600 may include a moving body 610', a moving housing 630, an upper stabler 640, and an upper damper 670.

The moving housing 630, the upper stabler 640, and the upper damper 670 may be disposed on the moving body 610' and the top tray 620.

The moving housing 630 may have an inner plate 632 and an upper perimeter wall 634.

The inner plate 632 may be disposed on the moving body 610' to cover a space S. The inner plate 632 may be fastened to the moving body 610' by a fastening member 621 such as a screw.

The moving body 610' may include a lower body 610a and a protruding body 610b, like the moving body illustrated in FIG. 14. The protruding body 610*b* of the moving body 610' may be fastened to the inner plate 632 through the fastening member 621.

An upper supporter 636 supporting the upper stabler 640 may be disposed on the inner plate 632.

The upper supporter 636 may be installed on the inner plate 632 to support the upper moving body 650. The upper supporter 636 may support the upper moving body 650 so that the upper moving body 650 is spaced apart from the inner plate 632.

A plurality of upper supporters 636 may be provided on the inner plate 632, and the plurality of upper supporters 636 may be spaced apart from each other in the horizontal direction.

The lower surface 654 of the upper moving body 650 may be placed on the upper supporter 636, and the lower surface 654 of the upper moving body 650 may be spaced apart from the upper surface of the inner plate 632 in the vertical direction.

The upper supporter 636 may include a rolling member accommodated in the inner plate 632. The rolling member may include a spherical ball or a cylindrical roller.

The inner plate 632 may have a supporter accommodating portion 638 capable of accommodating the lower portion of the upper supporter 636.

The upper supporter 636 may have an upper portion positioned above the upper supporter accommodating portion 638, and the ball or the roller accommodated in the upper supporter accommodating portion 638 may come into contact with the lower surface 654 of the upper moving body 650. When the upper moving body 650 moves, the ball or the roller may guide the upper moving body 650 while rolling within the supporter accommodating portion 638.

The upper perimeter wall 634 may be provided on the inner plate 632. The upper perimeter wall 634 may protrude from the upper surface of the inner plate 632. An upper space S3 may be formed inside the upper perimeter wall 634. Like the perimeter wall 520, the upper perimeter wall 634 may include a front wall, a rear wall, a left wall, and a right wall. The upper space S3 surrounded by the front wall, the rear wall, the left wall, and the right wall may be formed.

The upper space S3 may be an upper stabler accommodating space in which all or part of the upper stabler 640 is movably accommodated, and may be an upper damper accommodating space in which the upper damper 670 is accommodated.

The moving housing 630 may be movable together with the moving body 610' above the moving body 610', and the moving housing 630 may be movable above the housing 500.

The upper stabler 640 may have an upper moving body 650. The upper moving body 650 may be movably accommodated in the upper space S3. The size of the upper moving body 650 may be smaller than the size of the upper space S3. The overall shape of the upper moving body 650 may be the same as the overall shape of the upper space S3.

The upper stabler 640 may be defined as a portion on which a container containing liquid food is placed, and may support the container to minimize shaking of the liquid food.

The upper stabler 640 may be formed of a single member, or may be formed of a combination of a plurality of members.

The upper stabler 640 may further include a top tray 620 as well as an upper moving body 650.

The top tray 620 may be disposed on the upper moving body 650 and cover the upper space S3. The top tray 620 may cover the upper space S3 at the upper side of the upper space S3.

The size of the top tray 620 may be larger than the size of each of the upper moving body 650 and the upper space S3. The top tray 620 may prevent foreign materials such as dust or food from penetrating into the upper space S3. The top tray 620 may protect the upper moving body 650 from above the upper moving body 650. The top tray 620 may protect the upper damper 670.

The top tray 620 may be formed of a single member, or may be formed of a combination of a plurality of members. The top tray 620 may include a tray body 622 formed of a rigid body having a predetermined rigidity and a skin body 624 covering the upper surface of the tray body 622.

The skin body 624 may include an elastic material such as silicone.

The top tray 620 may also be integrated with the upper moving body 650, the upper moving body 650 having a smaller size than the upper space S3 is inserted into the upper the space S3, and the top tray 620 having a larger size than the upper space S3 may cover the upper space S3 from the upper side of the upper moving body 650.

The upper damper 670 may be disposed between the edge 652 of the upper moving body 650 and the upper perimeter wall 634. A plurality of upper dampers 670 may be provided.

The upper damper 670 may prevent the upper moving body 650 and the upper perimeter wall 634 from colliding with each other, and may prevent the upper moving body 650 from rapidly moving within the upper perimeter wall 634. The upper damper 670 may minimize the upper moving body 650 from coming into contact with the upper perimeter wall 634 between the upper movable body 650 and the upper perimeter wall 634.

The upper damper 670 may be disposed between four corners of the upper moving body 650 and the inner surface of the upper perimeter wall 634.

The upper damper 670 may be stretched to increase its width or compressed to decrease its width.

The upper damper 670 may be formed of an elastic member such as an elastically deformable rubber or a spring. There is no limitation in the kind of the upper damper 670 as long as the width can be deformed according to the movement of the upper moving body 650.

Among the configurations of another example of the tray illustrated in FIG. 16, the same reference numerals are used for the same components as those of the tray illustrated in FIG. 14, and a detailed description thereof is omitted.

The above description is merely illustrative of the technical spirit of the present invention, and various modifications and changes can be made by those of ordinary skill in the art, without departing from the scope of the present invention.

Therefore, the embodiments disclosed in the present invention are not intended to limit the technical spirit of the present invention, but are intended to explain the technical spirit of the present invention. The scope of the technical spirit of the present invention is not limited by these embodiments.

The scope of the present invention should be interpreted by the appended claims, and all technical ideas within the scope equivalent thereto should be construed as falling within the scope of the present invention.

The invention claimed is:

1. A tray comprising:

a housing having a lower plate and a perimeter wall on the lower plate, and having a space in the perimeter wall;

a support portion comprising a movable body that is movable while accommodated in the space and a top tray disposed on the movable body to cover the space of the housing;

a plurality of dampers disposed along the perimeter wall to contact an edge of the movable body during movement of the movable body; and an inner cover disposed on the housing and covering at least part of the movable body, wherein the inner cover comprises:

an opening for coupling between the movable body and the top tray; and a hollow rib protruding upward from a circumference of the opening.

2. The tray of claim 1, wherein the inner cover covers a space between the edge of the movable body and the perimeter wall.

3. The tray of claim 1, wherein the movable body comprises:

a lower body on which the edge is located; and a protruding body protruding from an upper surface of the lower body through the opening of the inner cover and connected to the top tray.

4. The tray of claim 1, wherein the support portion comprises:

a movable housing comprising an inner plate disposed on the movable body to cover the space, and an upper perimeter wall on the inner plate, wherein an upper space is in the upper perimeter wall; and an upper support portion comprising an upper movable body that is movable while accommodated in the upper space; and a plurality of upper dampers disposed along the upper perimeter wall to contact an edge of the upper movable body during movement of the upper movable body.

5. The tray of claim 4, wherein the upper support portion comprises a top tray disposed on the movable housing to cover the upper space.

6. The tray of claim 1, wherein each of the plurality of dampers comprises an elastic member, a cross-section of which has a closed loop shape.

7. The tray of claim 1, wherein each of the plurality of dampers comprises a plate spring having a movable body contact portion that comes into contact with the edge of the movable body during the movement of the movable body, and a perimeter wall contact portion contacting an inner surface of the perimeter wall.

8. The tray of claim 1, further comprising a rollable member in the lower plate, on which the movable body is seated.

9. The tray of claim 1, further comprising a lower spring disposed on the lower plate and fastened to the movable body.

10. The tray of claim 9, wherein the lower spring comprises a spiral spring disposed between the lower plate and a lower surface of the movable body, and connected to the movable body.

11. The tray of claim 10, wherein an outer circumference of the spiral spring is fitted to the lower plate, and wherein the spiral spring comprises:

a central portion spaced apart from the outer circumference and having a hole through which a fastening member fastened to the movable body passes; and a bridge connecting the outer circumference and the central portion, and having a spiral shape.

12. The tray of claim 11, wherein the lower plate has an opening through which the fastening member passes at a lower side of the lower spring.

13. The tray of claim 1, further comprising a lock coupled to the housing to lock the movable body.

14. A mobile robot comprising:

a driving wheel;

a frame disposed on the mobile robot; and a tray disposed on the frame, wherein the tray comprises:

a housing having a lower plate and a perimeter wall on the lower plate, and having a space in the perimeter wall;

a support portion comprising a movable body that is movable while accommodated in the space and a top tray disposed on the movable body to cover the space of the housing;

a plurality of dampers disposed along the perimeter wall to contact an edge of the movable body during movement of the movable body; and an inner cover disposed on the housing and covering at least part of the movable body, wherein the inner cover comprises:

an opening for coupling between the movable body and the top tray; and a hollow rib protruding upward from a circumference of the opening.

15. The mobile robot of claim 14, wherein the frame comprises a shelf, and wherein the housing is seated on the shelf or coupled to the shelf.

16. The mobile robot of claim 14, wherein the housing is coupled to the frame.

17. The mobile robot of claim 14, wherein the inner cover covers a space between the edge of the movable body and the perimeter wall.

18. A tray comprising:

a housing having a lower plate, and a perimeter wall on the lower plate, and having a space in the perimeter wall;

a support portion comprising a movable body that is movable while accommodated in the space and a top tray disposed on the movable body to cover the space of the housing;

a plurality of dampers disposed along the perimeter wall to contact an edge of the movable body during movement of the movable body; and a lower spring disposed on the lower plate and fastened to the movable body, wherein the lower spring comprises a spiral spring disposed between the lower plate and a lower surface of the movable body, and connected to the movable body, and wherein the spiral spring comprises:

an outer circumference portion that is fitted to the lower plate;

a central portion spaced apart from the outer circumference portion and having a hole through which a fastening member fastened to the movable body passes; and a bridge connecting the outer circumference portion and the central portion, and having a spiral shape.

* * * * *